US008495452B2

(12) United States Patent
Fee et al.

(10) Patent No.: US 8,495,452 B2
(45) Date of Patent: Jul. 23, 2013

(54) HANDLING CORRUPTED BACKGROUND DATA IN AN OUT OF ORDER EXECUTION ENVIRONMENT

(75) Inventors: Michael Fee, Cold Spring, NY (US);
Christian Habermann, Stuttgart (DE);
Christian Jacobi, Schoenaich (DE);
Diana L. Orf, Somerville, MA (US);
Martin Recktenwald, Steinenbronn (DE); Hans-Werner Tast, Schoenbuch (DE); Ralf Winkelmann, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 13/024,775

(22) Filed: Feb. 10, 2011

(65) Prior Publication Data
US 2012/0210188 A1    Aug. 16, 2012

(51) Int. Cl.
*H03M 13/00* (2006.01)
(52) U.S. Cl.
USPC ........... 714/752; 714/758; 714/763; 711/100; 711/113; 711/118

(58) Field of Classification Search
USPC .............. 714/752, 758, 763; 711/100, 113, 711/118
See application file for complete search history.

(56) References Cited

U.S. PATENT DOCUMENTS

| 6,799,293 B2 * | 9/2004 | Peters et al. ................. 714/763 |
| 7,062,784 B2 * | 6/2006 | Sinquin et al. ................. 726/26 |
| 2008/0307268 A1 | 12/2008 | Azevedo et al. |
| 2009/0019306 A1 | 1/2009 | Hum et al. |
| 2012/0096223 A1 * | 4/2012 | Castelloe ..................... 711/118 |

* cited by examiner

*Primary Examiner* — Guy Lamarre
(74) *Attorney, Agent, or Firm* — Dennis Jung

(57) ABSTRACT

Handling corrupted background data in an out of order processing environment. Modified data is stored on a byte of a word having at least one byte of background data. A byte valid vector and a byte store bit are added to the word. Parity checking is done on the word. If the word does not contain corrupted background date, the word is propagated to the next level of cache. If the word contains corrupted background data, a copy of the word is fetched from a next level of cache that is ECC protected, the byte having the modified data is extracted from the word and swapped for the corresponding byte in the word copy. The word copy is then written into the next level of cache that is ECC protected.

21 Claims, 4 Drawing Sheets

HANDLING CORRUPTED BACKGROUND DATA IN AN OUT OF ORDER EXECUTION ENVIRONMENT

BACKGROUND

The present invention relates in general to cache operations and, more particularly, to the handling of corrupted background data in an out of order execution environment to avoid instruction processing damage.

A computer system typically includes a processor coupled to a hierarchical storage system. The hardware can dynamically allocate parts of memory within the hierarchy for addresses deemed most likely to be accessed soon. The type of storage employed in each staging location relative to the processor is normally determined by balancing requirements for speed, capacity, and costs.

A commonly employed memory hierarchy includes a special, high-speed memory known as cache, in addition to the conventional memory which includes main memory and bulk memory. Cache memory may be arranged in a variety of configurations.

Multiple levels of cache memory may be present in computer systems. For example, L1 cache, from Level 1 cache, is known as the primary cache and is built into a microprocessor. L1 cache is the smallest and fastest cache level. L2 cache, short for Level 2 cache, is a second level of cache that is larger and slower compared to L1 cache. L2 cache, also called the secondary cache, may be found on a separate chip from the microprocessor chip or may be incorporated into a microprocessor chip's architecture. Other layers of cache, such as L3 or Level 3 cache, may also be implemented on the microprocessor chip or on a separate chip.

Caches may have built-in failure checks and may use either parity or error correction code (ECC) methods for detecting errors. For example, parity checks require an extra bit for every 8 bits of data and check for memory errors using even parity or odd parity checks. For even parity, when the 8 bits in a byte receive data, the chip adds up the total number of 1 s. If the total number of 1 s is odd, the parity bit is set to 1. If the total is even, the parity bit is set to 0. Odd parity works the same way, but the parity bit is set to 1 when the total number of 1 s in the byte is even. When the data is read from the cache, each byte is parity checked. The parity for the 8 bits is calculated again and compared against the stored parity bit. If they mismatch the chip knows that there is an error somewhere in the 8 bits and dumps the data.

Parity checking can detect all single bit errors. However, parity checking does nothing to correct the errors. If a byte of data does not match its parity bit, then the data are discarded and the system must recover. This problem can reduce cache efficiency and performance.

Some memory caches use a form of error checking known as error-correction code (ECC). Like parity, ECC uses additional bits to monitor the data in each byte. The difference is that ECC uses several bits for error checking instead of one. ECC uses a special algorithm not only to detect single bit errors, but actually correct them as well.

Modern microprocessors use several layers of caches to hide memory latency from the core processing units. Usually the lower level cache hierarchies (e.g., L1 cache) use parity checking to detect data errors. Higher cache hierarchies (e.g., L2 cache, L3 cache) usually implement ECC to detect and correct data errors. If modified data is lost or gets corrupted on its way through the cache hierarchies, this is a major error and causes IPD (Instruction Processing Damage). This is why even though the L1 cache is only parity protected, the L1 store queue is ECC protected. A store queue (like the L1 store queue) is collecting store requests from the core and acts like a buffer that can be written faster than the actual L1 cache.

BRIEF SUMMARY

The various advantages and purposes of the exemplary embodiments as described above and hereafter are achieved by providing, according to a first aspect of the exemplary embodiments, a method of handling corrupted background data in a computer processing environment. The method includes storing modified data into a byte of a word having at least one byte of background data; adding a byte valid vector and a byte store bit to the word, the byte valid vector pointing to all bytes of the word that contain modified data and the byte store bit indicating if the word contains corrupted background data; and determining if the word contains corrupted background data, wherein the method is performed on one or more computing devices.

According to a second aspect of the exemplary embodiments, there is provided a computer program product for handling corrupt background data in an out of order processing environment. The computer program product including a computer readable storage medium having computer readable program code embodied therewith. The computer readable program code including computer readable program code configured to store modified data into a byte of a word having at least one byte of background data; computer readable program code configured to add a byte valid vector and a byte store bit to the word, the byte valid vector pointing to all bytes of the word that contain modified data and the byte store bit indicating if the word contains corrupted background data; and computer readable program code configured to determine if the word contains corrupted background data.

According to a third aspect of the exemplary embodiments, there is provided a system including a computer readable storage medium, the computer readable storage medium having program code stored thereon for handling corrupt background data. The program code including program code for storing modified data into a byte of a word having at least one byte of background data; program code for adding a byte valid vector and a byte store bit to the word, the byte valid vector pointing to all bytes of the word that contain modified data and the byte store bit indicating if the word contains corrupted background data; and program code for determining if the word contains corrupted background data.

According to a fourth aspect of the invention, there is provided an apparatus for handling corrupted background data. The apparatus includes a microprocessor comprising a core for processing data and parity checking, the core storing modified data on a byte of a word having at least one byte of background data; apparatus to add a byte valid vector and a byte store bit to the word, the byte valid vector pointing to all bytes of the word that contain modified data and the byte store bit indicating if the word contains corrupted background data; and the core determining if the word contains corrupted background data.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

Figure 1:
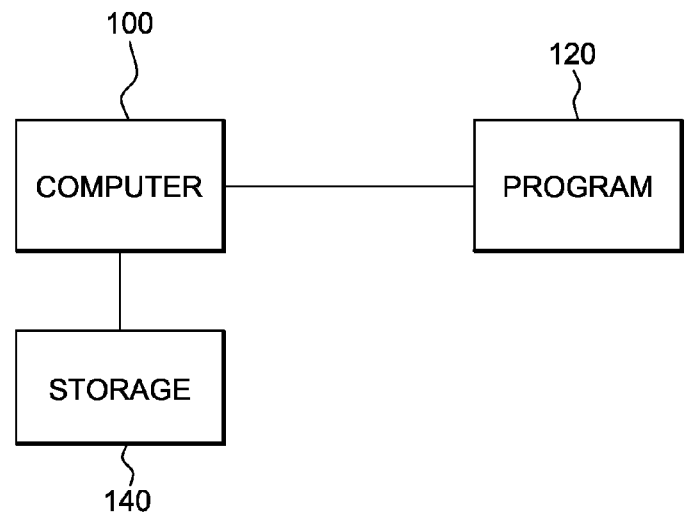
FIG. 1 is a block diagram illustrating an exemplary hardware environment.

FIG. 1 is a block diagram that illustrates an exemplary hardware environment of the present invention. The present invention is typically implemented using a computer 100 including one or more microprocessors, random access memory (RAM), read-only memory (ROM) and other components. The computer 100 may be a personal computer, mainframe computer or other computing instrumentality. Resident in the computer 100, or peripheral to it, will be a storage device 140 of some type such as a hard disk drive, floppy disk drive, CD-ROM drive, tape drive or other storage device.

The program 120 comprises instructions which, when read and executed by the microprocessor of the computer 100 causes the computer 100 to perform the operations necessary to execute the steps or elements of the present invention.

Figure 2:
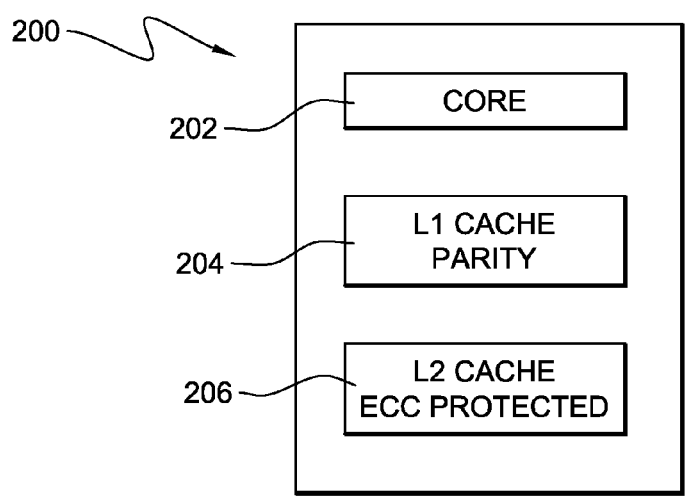
FIG. 2 is a block diagram of a microprocessor for use in the hardware environment of FIG. 1.

Referring now to FIG. 2, there is shown a block diagram of a microprocessor 200 of computer 100 from FIG. 1. The microprocessor 200 includes L1 cache 204 and L2 cache 206. For purposes of illustration and not limitation, L2 cache 206 is shown on the microprocessor 200 but in other embodiments, may be located on another semiconductor chip. Microprocessor 200 may additionally include L3 cache, on or off the microprocessor 200. L3 cache is not shown. For purposes of illustration and not limitation, the L1 cache is shown having parity checking and the L2 cache having ECC. In other embodiments, the L2 cache may also have parity checking and a higher level of cache (e.g., L3 cache) may have ECC. Generally speaking, a parity check is much easier and thus faster than an ECC check. It is possible to do a parity check on the fly whereas the ECC check would take one or two extra cycles. L1 cache have to provide fast access to their data content. Compared to the slower access on L2 or L3 caches, an extra one or two cycles for ECC checking would be a significant performance hit. Since L1 caches are small compared to an L2 cache or L3 cache, they should be suffering less bit flips in their cache arrays so it is preferred for L1 caches to have parity checking.

Computer 100 may contain only microprocessor 200 and single core 202. In exemplary embodiments, computer 100 may include more than one microprocessor 200 and microprocessor 200 may include more than one core 202. If microprocessor 200 includes more than one core, it typically is referred to as a multi-core processor. In a multi-core environment, there may be private and shared caches. For example, the L1 cache for each processor may be private for use by that processor only while the higher order caches (e.g., L2 cache, L3 cache) may be shared for access by more than one processor.

The exemplary embodiments are applicable to both single-core and multi-core processing systems and to both single processor and multiprocessor systems.

Data is modified on a byte granularity within the core processing unit 202 and stored back into the L1, L2, etc. caches 204, 206. The store path into the cache arrays is on a word (4 bytes) or even double word (8 bytes) boundary. The modified byte has to be combined with background data to form a word or a double word. Background data are unmodified bytes from the cache arrays joined to the modified byte to make up the 4 byte word or 8 bytes double word.

ECC for the combined word or double word is generated in parallel and provides error detection and correction ability. The ECC protection of the combined word is used to protect its way through various store queues, whereas the word is only parity protected when written back into the L1 cache. This combination of modified data with background data is critical and usually done before the modification of the data is reported as completed (checkpoint). However this makes it overly expensive when using out of order processing. Out of order processing allows for instructions to be executed when they are ready instead of waiting in order for a preceding instruction to execute first. For out of order processing, it would be preferable to merge modified bytes with background data after completion. However an error in the background data (which is only parity protected in lower cache hierarchies) would now cause IPD. The exemplary embodiments are most suitable for out of order processing. The exemplary embodiments may also be suitable for in-order processing although the value add is not as high since an in-order machine would detect the corrupted background data before checkpointing an instruction.

The exemplary embodiments enable the processor to propagate modified bytes through the cache hierarchies even though an error was detected on the background data and the cache level that detects the error does not facilitate error correction.

In an exemplary embodiment, there is an additional apparatus in addition to the normal implemented store method and will only be used in the error case. It consists of an additional apparatus within the first ECC protected cache hierarchy and several control signals that are propagated from lower cache hierarchies upwards. If the core processing unit detects that the background data is corrupted, the core processing unit will nevertheless merge the modified bytes with it and generate good ECC for this compound. However, this store will be flagged as a special store. The stored word or double word will be accompanied with a byte vector, pointing to each of the modified bytes. Once this word or double word reaches the first cache hierarchy with ECC protected data, the additional apparatus will use the background data from this cache hierarchy, combine it with the modified bytes and generate good ECC for the compound. The compound can then be written into this cache hierarchy.

In the following description of the exemplary embodiments, it is assumed for purposes of illustration and not limitation that the L1 cache is parity protected and the L2 cache is the first cache that is ECC protected. In other exemplary embodiments, the first cache that is ECC protected may be the L3 cache or even an higher order cache.

Figure 3:
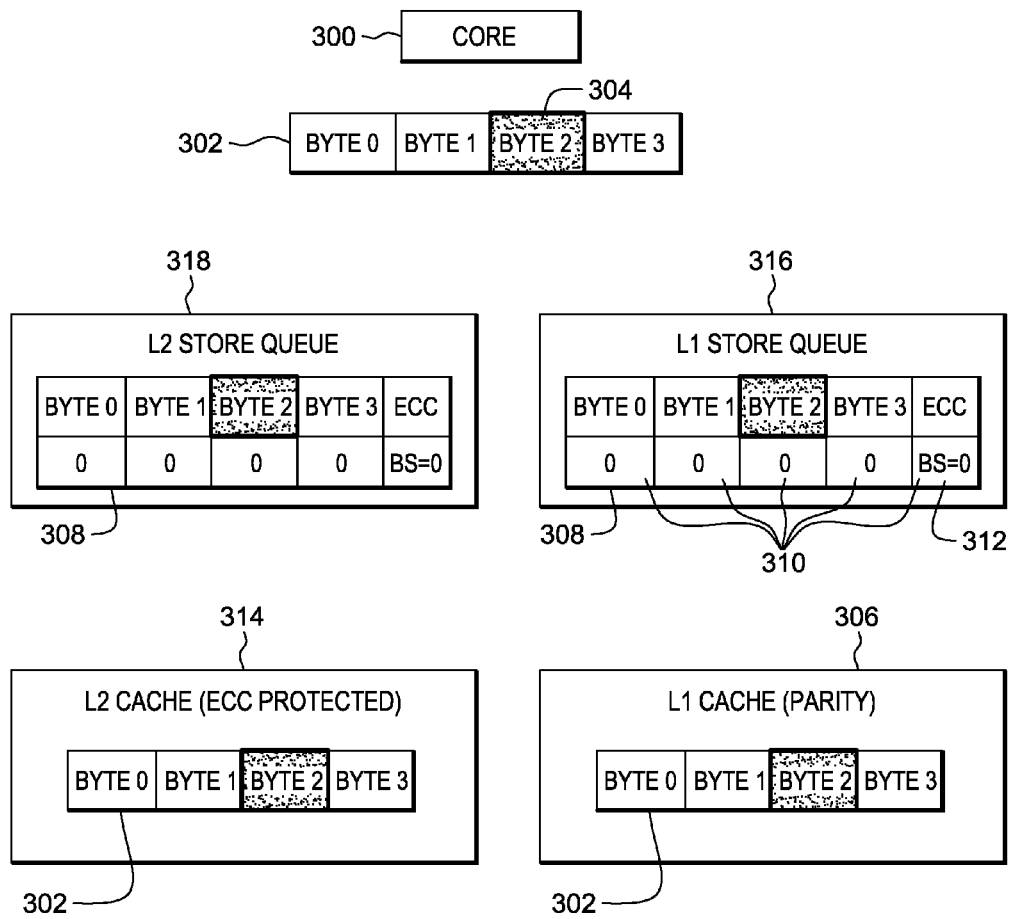
FIG. 3 is a block diagram of an exemplary embodiment when there is no error in background data using the microprocessor of FIG. 2.
Figure 5:
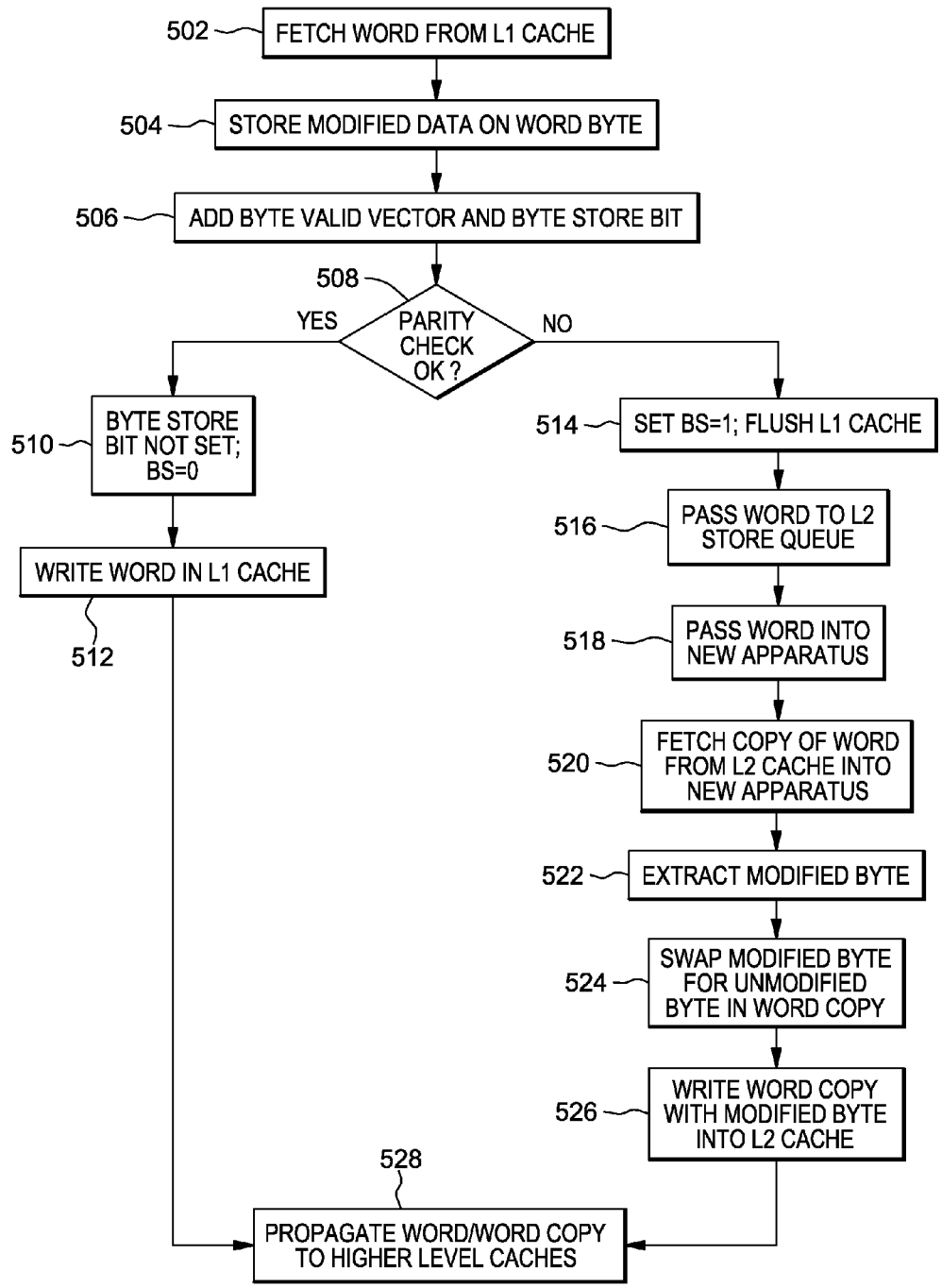
FIG. 5 is a flow chart illustrating the methodology of an exemplary embodiment.

Referring now to FIGS. 3 and 5, an exemplary embodiment will be described when there is no background data error. A core 300 of a microprocessor (such as microprocessor 200 in FIG. 2) performs a process. Thereafter, the core 300 fetches a 4 byte word 302 from the L1 cache 306 (block 502, FIG. 5) and stores modified data on modified byte 2 304 (block 504, FIG. 5). The core 300 performs a parity check on word 302 while receiving the word 302 from the L1 cache 306. The L1 cache 306 has a store queue 316 (L1 store queue) which collects store requests from the core 300 and acts like a buffer that can be written faster than the actual L1 cache 306. To implement the exemplary embodiments, a byte valid vector is added to word 302 by the store interface within the L1 store queue 316 which is able to point to all bytes of the data bus that contain modified data (block 506, FIG. 5). The byte valid vector has to be stored and will be propagated through all cache hierarchies from the L1 store queue 316 to the L2 store queue 318 and so on until the word reaches an ECC protected cache hierarchy. The merging of modified data with the background data by the core 300 and the generation of good ECC by the core 300 for the compound within the L1 cache stays the same. This ensures that additional errors that occur later can be detected or even corrected.

There is also needed a special signal, byte store, to indicate that a certain store cannot be treated as a normal store, but has to use the new apparatus of the exemplary embodiments (block 506, FIG. 5). The store interface in the L1 store queue adds the byte store signal to word 302. Normal stores are propagated on a word or even double word boundary and are simply written into the higher level cache hierarchies.

The word 302 is written into the L1 store queue 316 by the core 300 and now appears as word 308 which contains an extra byte store bit (BS) 312 and byte valid vectors 310. The core 300 previously performed a parity check on word 302. If the parity check indicated there is no error in the background data (block 508, FIG. 5), the byte store bit 312 is not set (block 510, FIG. 5) indicating there is no error in the background data and the word 308 can be written into the L1 cache 306 (block 512, FIG. 5) and higher level caches, L2, L3, etc. The exemplary embodiments use the convention that if the byte store bit is not set and the byte store bit is zero, there is no error in the background data while if the byte store bit is set to one, there is an error in the background data. This convention is for convenience only and is not a requirement of the exemplary embodiments as the convention may be reversed. The byte valid vectors 310 (all zeroes shown for word 308) are not used if the byte store bit 312 is zero. Word 308 is additionally propagated into the L2 store queue 318 and from there to the L2 cache 314 as well as other higher level caches, if any (block 528, FIG. 5). When the word 308 is written into the L1 cache 306 by the L1 store queue, the byte valid vectors 310 and the byte store bit 312 are not written so that the word appears as word 302. In a similar manner, word 302 may be written into the L2 cache 314 and higher level caches.

Figure 4:
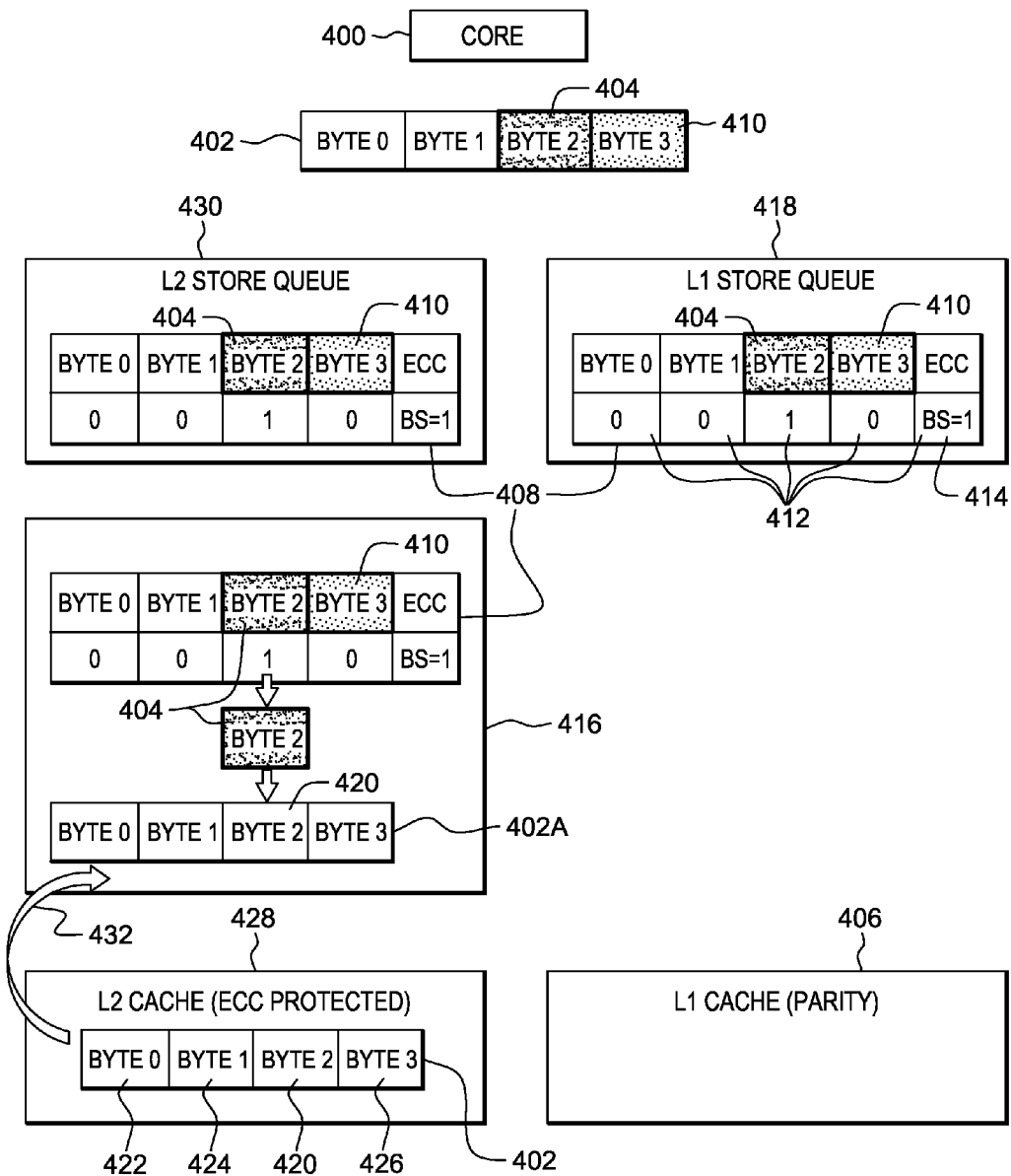
FIG. 4 is a block diagram of an exemplary embodiment where there is corrupted background data using the microprocessor of FIG. 2.

FIG. 4 illustrates a situation when there is an error in background data. Referring also to FIG. 5, a core 400 of a microprocessor (such as microprocessor 200 in FIG. 2) performs a process. Thereafter, the core 400 fetches a 4 byte word 402 from the L1 cache 406 (block 502, FIG. 5). Thereafter, core 400 stores modified data on modified byte 2 404 (block 504, FIG. 5) of word 402. The core 400 performs a parity check on word 402 while receiving the word 402 from the L1 cache 406. To implement the exemplary embodiments, a byte valid vector is added to the word 402 by the store interface within the L1 store queue 418 which is able to point to all bytes of the data bus that contain modified data and a byte store bit is added (block 506, FIG. 5). The byte store bit 414 may be set to one to indicate that it cannot be treated as a normal store, but has to use the new apparatus of the exemplary embodiments (block 506, FIG. 5).

The word 402 is written into the L1 store queue 418 by the core 400 and now appears as word 408 which contains a byte store bit 414 and byte valid vectors 412. The core 400 previously performed a parity check on word 402 (block 508, FIG. 5) and determined that byte 3 410 contains erroneous background data. The byte store bit 414 is set to one (BS=1) (block 514, FIG. 5), thereby marking this word 408 for special handling by the new apparatus of the exemplary embodiments. The byte valid vectors 412 indicate the bytes which have modified data. In the case of word 408, byte 2 404 contains modified data. The core 400 flushes the L1 cache (block 514, FIG. 5) so that the L1 cache is now empty.

Since the core 400 uses out of order processing, byte 2 404 has been marked as completed prior to merging with the background data. Once byte 2 404 has merged with the background data, the corrupt background data in byte 3 410 has been discovered. It is not possible to nullify the completion of byte 2 404. Accordingly, word 408 needs to be specially handled to avoid IPD.

In an exemplary embodiment, there is new apparatus 416 proposed for handling the corrupted background data. Word 408 is propagated into the L2 store queue 430 from the L1 store queue 418 (block 516, FIG. 5). Because word 408 contains corrupted background data, special handling of word 408 is required before it is written into the L2 cache 428. Word 408 is passed to apparatus 416 (block 518, FIG. 5). Apparatus 416 may be additional logic written into the microprocessor core 400. The apparatus 416 may be implemented as hardware, software or a combination of hardware and software. Apparatus 416 may be logically located between the L2 store queue 430 and the L2 cache 428. A good copy 402A of word 402 is fetched (indicated by arrow 432) from the L2 cache 428 into the apparatus 416 (block 520, FIG. 5). In an exemplary embodiment, apparatus 416 may form a part of the L2 cache 428 or may be separate from the L2 cache 428. Word 402 in L2 cache 428 is in the state prior to being modified with new data by core 400. Thus, byte 2 420 of word 402 contains unmodified data and byte 0 422, byte 1 424 and byte 3 426 all contain good background data.

Byte 2 404 (containing modified data) of word 408 is extracted from word 408 (block 522, FIG. 5) and swapped for byte 2 420 of word copy 402A (block 524, FIG. 5). That is, byte 2 404 containing modified data from word 408 is inserted into word copy 402A in place of byte 2 420. Word copy 402A, now modified by byte 2 404 containing modified data, is then written into L2 cache 428 (block 526, FIG. 5) and propagated to the higher level caches (block 528, FIG. 5).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method of handling corrupted background data in a computer processing environment comprising:
   storing modified data into a byte of a word having at least one byte of background data;
   adding a byte valid vector and a byte store bit to the word, the byte valid vector pointing to all bytes of the word that contain modified data and the byte store bit indicating if the word contains corrupted background data; and
   determining if the word contains corrupted background data;
   wherein the method is performed on one or more computing devices.

2. The method of claim 1 wherein an outcome of determining is that the word contains at least one byte of corrupted background data and further comprising:
   setting the byte store bit to indicate that there is corrupted background data;
   fetching a copy of the word from a next level of cache that is ECC (error code correction) protected;
   extracting the byte having the modified data from the word;
   swapping the byte having the modified data for a corresponding byte into the word copy; and
   writing the word copy with the byte having the modified data into the next level of cache that is ECC protected.

3. The method of claim 1 wherein an outcome of determining is that the word contains at least one byte of corrupted background data and further comprising:
   setting the byte store bit to indicate that there is corrupted background data;
   passing the word to a store queue of the next level of cache that is ECC (error code correction) protected;
   fetching a copy of the word from the next level of cache that is ECC protected;
   extracting the byte having the modified data from the word;
   swapping the byte having the modified data for a corresponding byte into the word copy; and
   writing the word copy with the byte having the modified data into the next level of cache that is ECC protected, wherein the byte valid vector and byte store bit are not written into the next level of cache that is ECC protected.

4. The method of claim 1 wherein an outcome of determining is that the word contains no corrupted background data, the byte valid vector is ignored, the byte store bit is not set to indicate there is no corrupted background data and further comprising writing the word into a cache.

5. The method of claim 1 wherein determining includes parity checking of the word.

6. The method of claim 1 wherein the method is used in an out of order processing environment.

7. The method of claim 1 wherein the word is a 4 byte word or 8 byte word.

8. A computer program product for handling corrupt background data in an out of order processing environment, the computer program product comprising:

a computer readable storage medium having computer readable program code embodied therewith, the computer readable program code comprising:

computer readable program code configured to store modified data into a byte of a word having at least one byte of background data;

computer readable program code configured to add a byte valid vector and a byte store bit to the word, the byte valid vector pointing to all bytes of the word that contain modified data and the byte store bit indicating if the word contains corrupted background data; and computer readable program code configured to determine if the word contains corrupted background data.

9. The computer program product of claim 8 wherein an outcome of computer readable program code configured to determine is that the word contains at least one byte of corrupted background data and further comprising:

computer readable program code configured to set the byte store bit to indicate that there is corrupted background data;

computer readable program code configured to fetch a copy of the word from a next level of cache that is ECC (error code correction) protected;

computer readable program code configured to extract the byte having the modified data from the word;

computer readable program code configured to swap the byte having the modified data for a corresponding byte into the word copy; and computer readable program code configured to write the word copy with the byte having the modified data into the next level of cache that is ECC protected.

10. The computer program product of claim 8 wherein an outcome of determining is that the word contains at least one byte of corrupted background data and further comprising:

computer readable program code configured to set the byte store bit to indicate that there is corrupted background data;

computer readable program code configured to pass the word to a store queue of the next level of cache that is ECC (error code correction) protected;

computer readable program code configured to fetch a copy of the word from the next level of cache that is ECC protected;

computer readable program code configured to extract the byte having the modified data from the word;

computer readable program code configured to swap the byte having the modified data for a corresponding byte into the word copy; and computer readable program code configured to write the word copy with the byte having the modified data into the next level of cache that is ECC protected, wherein the byte valid vector and byte store bit are not written into the next level of cache that is ECC protected.

11. The computer program product of claim 8 wherein an outcome of computer readable program code configured to determine is that the word contains no corrupted background data, the byte valid vector is ignored, the byte store bit is not set to indicate there is no corrupted background data and further comprising computer readable program code configured to write the word into a cache.

12. The computer program product of claim 8 wherein computer readable program code configured to determine includes parity checking of the word.

13. The computer program product of claim 8 wherein the corrupt background data is in an out of order processing environment.

14. A system including a computer readable storage medium, the computer readable storage medium having program code stored thereon for handling corrupt background data, the program code comprising:

program code for storing modified data into a byte of a word having at least one byte of background data;

program code for adding a byte valid vector and a byte store bit to the word, the byte valid vector pointing to all bytes of the word that contain modified data and the byte store bit indicating if the word contains corrupted background data; and program code for determining if the word contains corrupted background data.

15. The system of claim 14 wherein an outcome of program code for determining is that the word contains at least one byte of corrupted background data and further comprising:

program code for setting the byte store bit to indicate that there is corrupted background data;

program code for fetching a copy of the word from a next level of cache that is ECC (error code correction) protected;

program code for extracting the byte having the modified data from the word;

program code for swapping the byte having the modified data for a corresponding byte into the word copy; and program code for writing the word copy with the byte having the modified data into the next level of cache that is ECC protected.

16. The system of claim 14 wherein an outcome of determining is that the word contains at least one byte of corrupted background data and further comprising:

program code for setting the byte store bit to indicate that there is corrupted background data;

program code for passing the word to a store queue of the next level of cache that is ECC (error code correcting) protected;

program code for fetching a copy of the word from the next level of cache that is ECC protected;

program code for extracting the byte having the modified data from the word;

program code for swapping the byte having the modified data for a corresponding byte into the word copy; and program code for writing the word copy with the byte having the modified data into the next level of cache that is ECC protected, wherein the byte valid vector and byte store bit are not written into the next level of cache that is ECC protected.

17. The system of claim 14 wherein an outcome of program code for determining is that the word contains no corrupted background data, the byte valid vector is ignored, the byte store bit is not set to indicate there is no corrupted background data and further comprising program code for writing the word into a cache.

18. The system of claim 14 wherein program code for determining includes parity checking of the word.

19. The system of claim 14 wherein the corrupt background data is in an out of order processing environment.

20. An apparatus for handling corrupted background data comprising:

a microprocessor comprising a core for processing data and parity checking;

the core storing modified data on a byte of a word having at least one byte of background data;

apparatus to add a byte valid vector and a byte store bit to the word, the byte valid vector pointing to all bytes of the word that contain modified data and the byte store bit indicating if the word contains corrupted background data;

and the core determining if the word contains corrupted background data.

21. The apparatus of claim 20 wherein the core determining that the word contains at least one byte of corrupted background data and further comprising:

a cache having error code correction (ECC) checking; and an apparatus for:

fetching a copy of the word from the cache having ECC checking;

extracting the byte having the modified data from the word;

swapping the byte having the modified data for a corresponding byte into the word copy; and writing the word copy with the byte having the modified data into the cache that has ECC checking.

* * * * *